(12) United States Patent
Lange et al.

(10) Patent No.: US 6,384,538 B1
(45) Date of Patent: May 7, 2002

(54) CONTROL APPARATUS FOR A LIGHT UNIT FOR VEHICLES

(75) Inventors: Petrik Lange, Lippstadt; Wilhelm Mertens, Rietberg; Frank Passgang, Lippstadt; Juergen Reuter, Anroechte, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/657,922

(22) Filed: Sep. 8, 2000

(30) Foreign Application Priority Data

Sep. 8, 1999 (DE) .......................................... 199 42 729

(51) Int. Cl.[7] ................................................ B60Q 1/04
(52) U.S. Cl. ............................ 315/77; 315/82; 307/10.8
(58) Field of Search ............................ 315/77, 82, 83; 307/10.1, 10.8

(56) References Cited

U.S. PATENT DOCUMENTS 5,602,427 A * 2/1997 Dimitriev .................. 307/10.8

FOREIGN PATENT DOCUMENTS

| DE | 4126449 A1 | 2/1992 |
|---|---|---|
| DE | 4341058 C1 | 4/1995 |
| DE | 19600638 A1 | 7/1996 |
| DE | 4203704 C3 | 6/1999 |
| EP | 0624495 B1 | 7/1997 |
| EP | 0830982 A2 | 3/1998 |

* cited by examiner

Primary Examiner—David Vu
(74) Attorney, Agent, or Firm—Birch, Stewart, Kolasch & Birch

(57) ABSTRACT

Control apparatus for a light unit for vehicles, in particular motor vehicles, includes an electronic control unit for controlling the light unit, with the control unit having an I/O interface for connecting to a plurality of control and/or switching devices assigned to the light unit. The electronic control unit is arranged in a rectangularly-shaped housing which is detachably mounted in a receptacle of the light unit. A first contacting device is provided on a first side of the electronic control unit for connecting the electronic control unit to a number of electric components integrated into the light unit, and in addition a second contacting device is provided on a second side for connecting the electronic control unit to a number of additional electric components arranged near the light unit.

10 Claims, 4 Drawing Sheets

CONTROL APPARATUS FOR A LIGHT UNIT FOR VEHICLES

BACKGROUND OF THE INVENTION

This application claims a priority based on German application serial number 199 42 729.1, filed Sep. 8, 1999, and the contents of that application are incorporated herein by reference.

This invention relates to a control apparatus for a light unit of a vehicle, in particular a motor vehicle, of a type having an electronic control unit to control the light unit, where the control unit has an Input/Output (I/O) interface for connection to a plurality of control and/or switching elements allocated to the light unit.

European Patent 624 495 B 1 discloses a control apparatus for a light unit of a vehicle, having an electronic control unit for controlling a light unit with several lamps. The electronic control unit is structured essentially as a circuit board which is inserted into an open side of a rectangularly-shaped receptacle and is locked there by a cover. The electronic control unit is connected to conductor leads of the lamps and serves only to turn them off and on in a controlled manner.

German Patent Application 196 00 638 A1 describes a control apparatus for a light unit of a vehicle having an electronic control unit for controlling the light unit. The electronic control unit is accommodated in a housing which is in turn attached to a cover cap of the light unit. To this end, a receptacle for the housing adapted to a shape of the cover cap is provided. A disadvantage of this known control apparatus is that mounting of the control unit on the light unit is relatively expensive and complicated. Furthermore, accessibility to the control unit is poor because it is attached to the cover cap from beneath.

In addition, European Patent Application 830 982 A2 describes a control apparatus for a light unit of a vehicle suitable for controlling other mechanical functions, for example of the light unit, in addition to the actual light function of the light unit. The electronic control unit has an I/O interface by means of which it is connected to a plurality of the control and switching devices assigned to the light unit. A disadvantage of this known control apparatus is that it serves only to control electrically operable functions allocated exclusively to the light unit.

It is an object of this invention to improve upon a control apparatus for a light unit of a vehicle such that firstly, functionality of an electronic control unit thereof is expanded, and secondly, the electronic control unit has a compact and space-saving structure, with attachment of the light unit being accomplished in such a way that good accessibility to the electronic control unit is assured.

SUMMARY OF THE INVENTION

According to principles of this invention, an electronic control unit of a control apparatus for a light unit of a vehicle, of the type mentioned in the opening paragraph above, is arranged in a housing that is detachably mounted in a receptacle of the light unit. A first contacting device is provided on a first side of the housing, for connecting the electronic control unit to a number of electric components integrated into the light unit, and, additionally, a second contacting device is provided on a second side of the housing, for connecting the electronic control unit to a number of additional electric components next to the light unit.

An advantage of the control apparatus of this invention is that first, an electronic control unit is arranged compactly in a housing that can be inserted into or removed from a receptacle, or container, of the light unit in a structure that provides maintenance access. On a first side, or end, the housing has a first contacting device for electric connection to a number of electric components integrated into the light unit, such as lamps, headlight beam adjusters, etc. In addition, the housing has a second contacting device for connecting the electronic control unit to a number of additional components outside of, or next to, the light unit. According to this invention, this makes it possible for additional local optical and/or electric accessories, such as a supplementary fog light and a supplementary fan, to be controlled. The second contacting device can also be used to advantage to connect the electronic control unit to a vehicle power network or to central components of the vehicle. The basic idea of this invention is to provide a decentralized or auxiliary, control unit in an area of the vehicle where space is limited, so that any electrically operated functions arranged in the vicinity thereof can be controlled by this control unit.

According to a special embodiment of this invention, the housing is mounted in a pocket-shaped receptacle of the light unit. The pocket-shaped receptacle is preferably structured to be open at the top, so that the housing can be mounted and dismounted therefrom easily.

According to an enhancement of this invention, the first contacting device is arranged in a floor area of the pocket-shaped receptacle so that a secure and protected contacting of the electronic control unit with the light unit can be achieved under the influence of weight force of the housing.

According to a further enhancement of this invention, the pocket-shaped receptacle is structured as a U-shaped holding part integrally formed or molded on a back side of the light unit. The height and width of the housing can thus be adapted advantageously to dimensions of the back side of the light unit so that the electronic control unit can then be mounted in a space-saving manner directly on the back of the light unit.

According to one embodiment of this invention, the housing is held with a snap-lock mechanisms in the pocket-shaped receptacle of the light unit. A plurality of contact elements of the second contacting device extend essentially flush with one side, or end, of the light unit and covers it. The contact elements preferably extend in pairs in a row completely over the second side of the housing, so that the second side of the housing is essentially completely covered after connecting the contact elements to a corresponding plug connector.

BRIEF DESCRIPTION OF THE DRAWINGS

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the views. The drawings are not necessarily to scale, emphasis instead being placed upon illustrating principles of the invention in a clear manner.

DESCRIPTION OF THE PREFERRED EMBODIMENT

Figure 1:
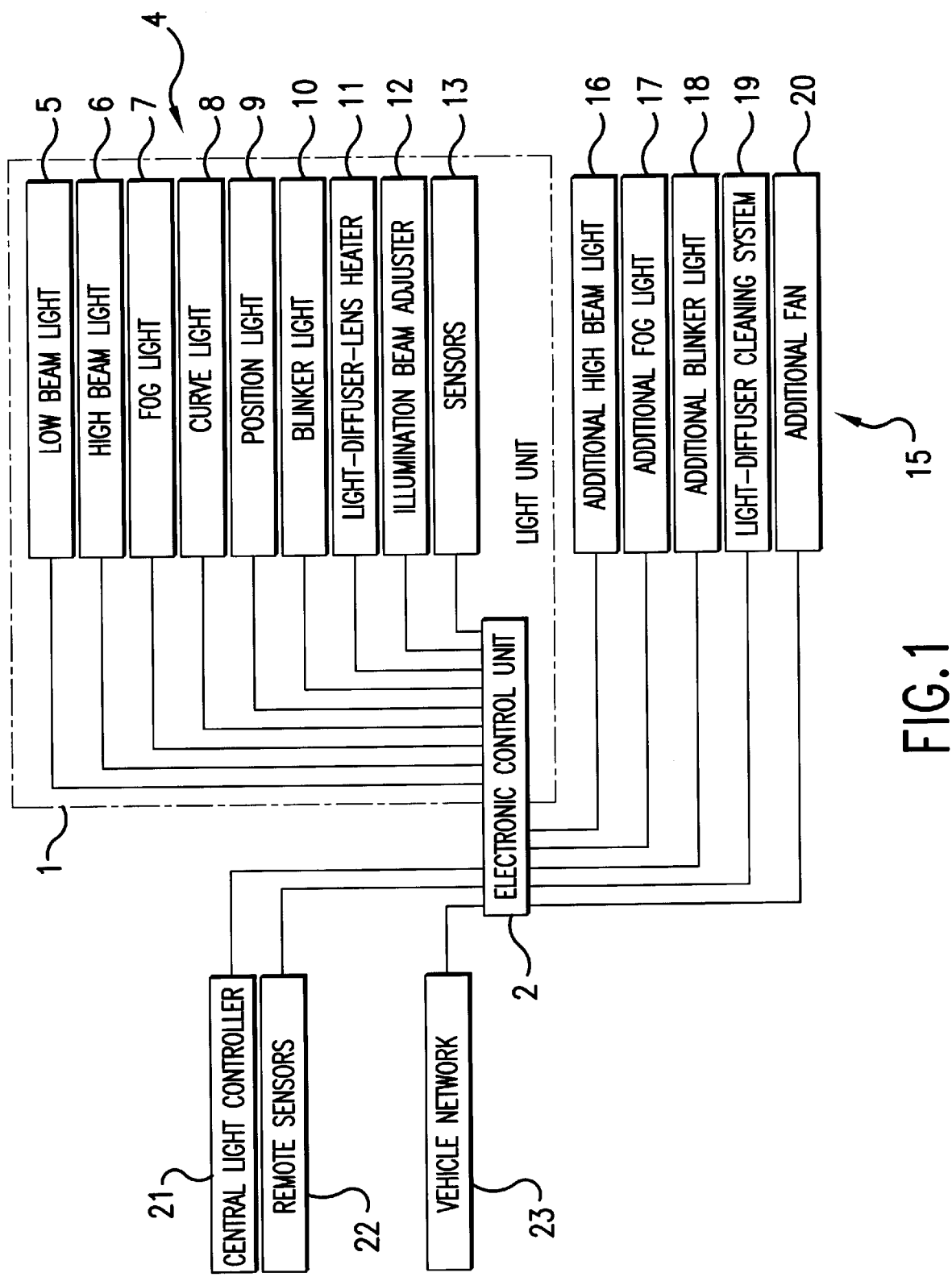
FIG. 1 is a block diagram with an electronic control unit for a light unit structured as a headlight.

According to this invention, a control apparatus for a light unit 1, which is preferably structured as a known headlight, has an electronic control unit 2 which is connected by a first contacting device 3 to a number of electric components 4 integrated into the light unit 1. The components 4 may be structured as lamps, for example as a low beam light 5, a high beam light 6, a fog light 7, a curve light 8, a position light 9 or a blinker light 10. In addition, the light unit 1 may have a light-diffusor-lens heater 11, an illumination beam adjuster 12, and sensors 13 which are operated electrically by the control unit 2. To this end, the electronic control unit 2, which preferably has a microprocessor, generates control signals or switching signals that are transmitted to the corresponding components 4 by an input/output (I/O) interface (not shown) and the first contacting device 3 (FIG. 2).

The electronic control unit 2 also has a second contacting device 14 which permits connection to a number of additional electric components 15 provided near the light unit 1. These additional electric components 15 may include, for example, an additional high beam light 16, an additional fog light 17, an additional blinker light 18, a light-diffusor cleaning system 19 or an additional fan 20, which are arranged in the vicinity of the light unit 1. In addition, the electronic control unit 2 is connected by the second contacting device 14 to a central light controller 21 which is dominant to the electronic control unit 2 and has controlling and switching elements for controlling components 4 and 15. Furthermore, the electronic control unit 2 is connected by the second contacting device 14 to remote sensors 22 of the vehicle, for example, a velocity sensor and a height sensor, whose sensed quantities determine how light functions of the light unit 1 and/or the additional lights are controlled. Furthermore, the electronic control unit 2 is connected by the second contacting device 14 to a vehicle power-supply network 23 by means of which a power supply for the electronic control unit 2, and/or the downstream components 4, 15 is assured.

Figure 2:
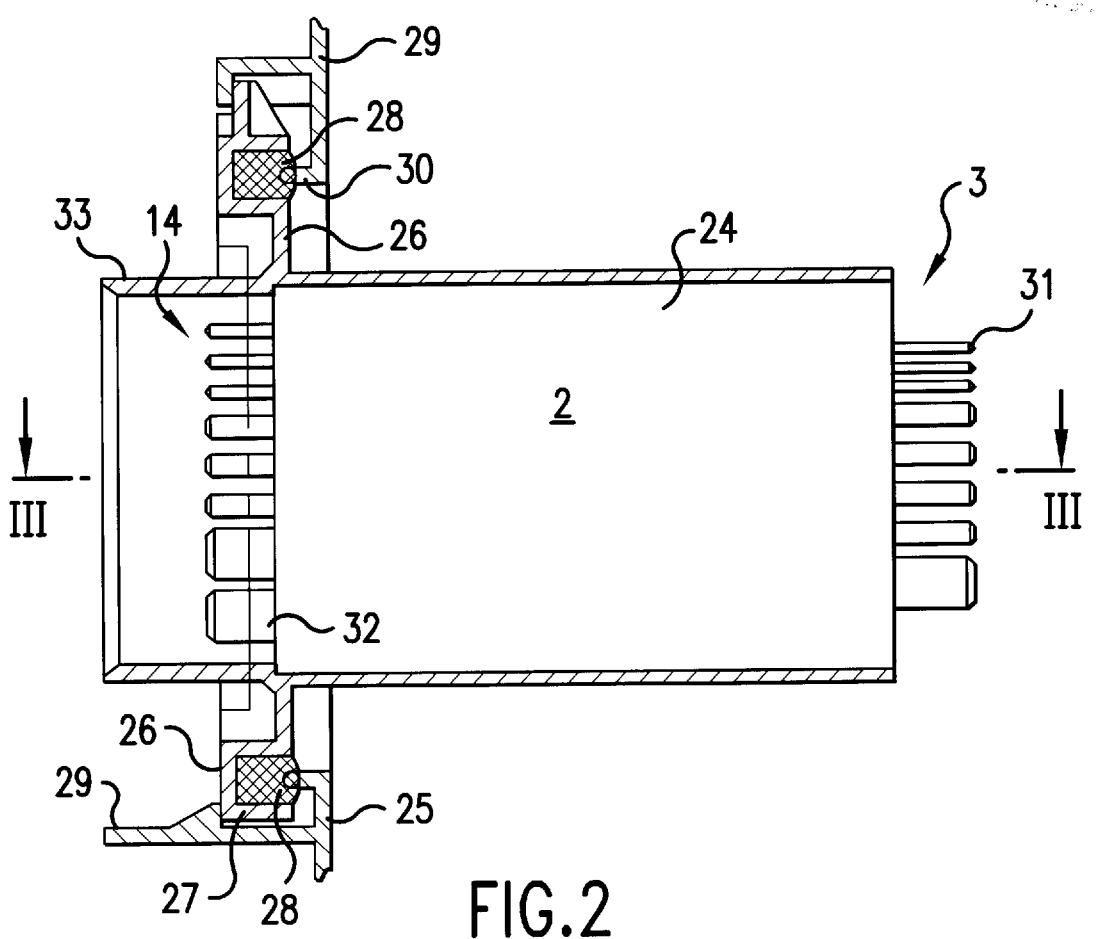
FIG. 2 is a longitudinal section through an electronic control unit mounted in a light unit of a first embodiment.
Figure 3:
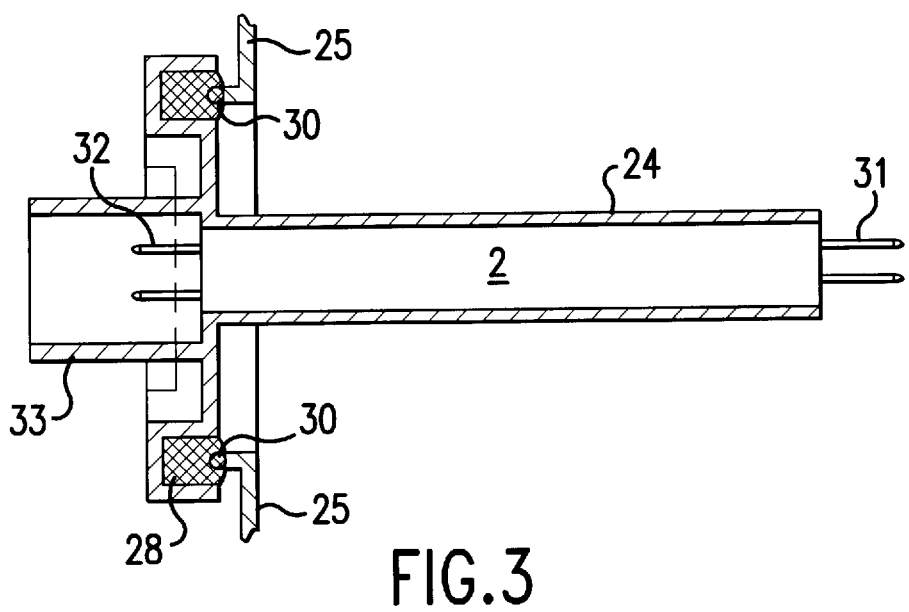
FIG. 3 is a section along line III—III in FIG. 2.

According to a first embodiment of FIGS. 2 and 3, the electronic control unit 2 is arranged in a rectangularly-shaped housing 24 which is snap locked onto a headlight housing 25. To this end, the housing 24 has sidewardly-projecting snap-lock tabs 26 which have an open U-shaped section 27 on a side facing the headlight (not shown), in which a foam or rubber gasket 28 is arranged. Edge-side snap-lock hooks 29 of the headlight housing 24 press the peripheral gasket 28 against a projecting stop 30 of the headlight housing 25 so that, after inserting the housing 24 into the opening of the headlight housing 25, limited by the stops 30, a secure and sealed, detachable connection is established between the headlight housing 25 and the housing 24 of the electronic control unit 2.

On an end side of the housing 24 facing the headlight, a number of projecting contact elements 31 are arranged in pairs which can be connected electrically to plug connectors (not shown) of the components 4 integrated into the headlight. The second contacting device 14, with similarly structured projecting contact elements 32, is arranged on an end side facing away from the headlight which can be connected to corresponding plug connector contacts of the additional electric components 15. As FIG. 3 clearly shows, a thickness of the housing 24 is selected such that it corresponds essentially to a width of plug connectors to be connected to the contact elements 31 and 32. The housing 24 is therefore structured as a flattened housing with a small thickness. A peripheral collar 33 is provided to receive the plug connectors on the second contacting device 14.

Figure 4:
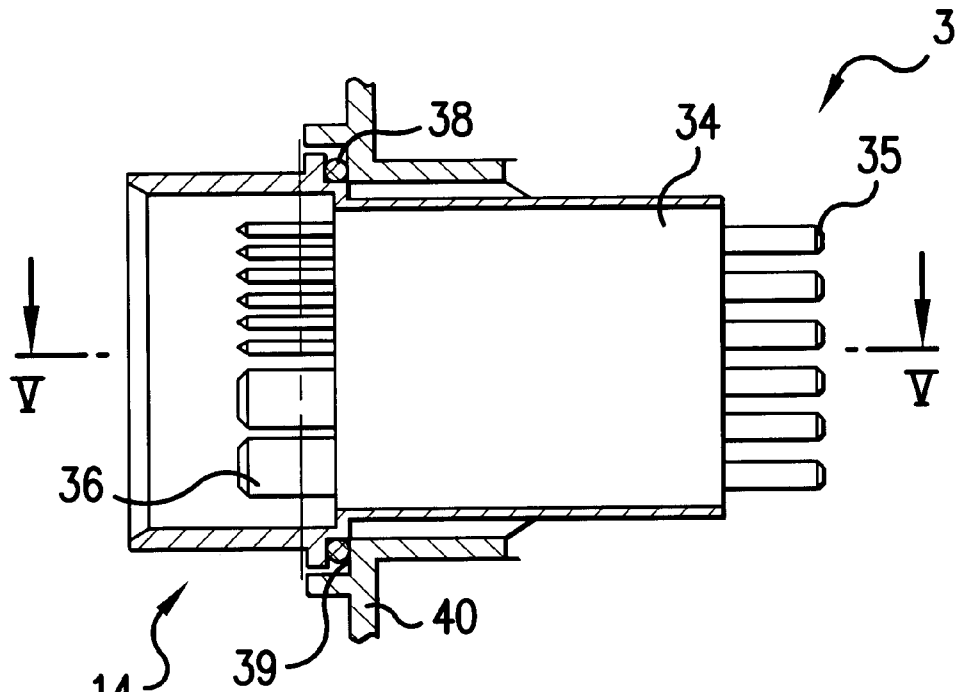
FIG. 4 is a longitudinal section through an electronic control unit mounted in the light unit of a second embodiment.
Figure 5:
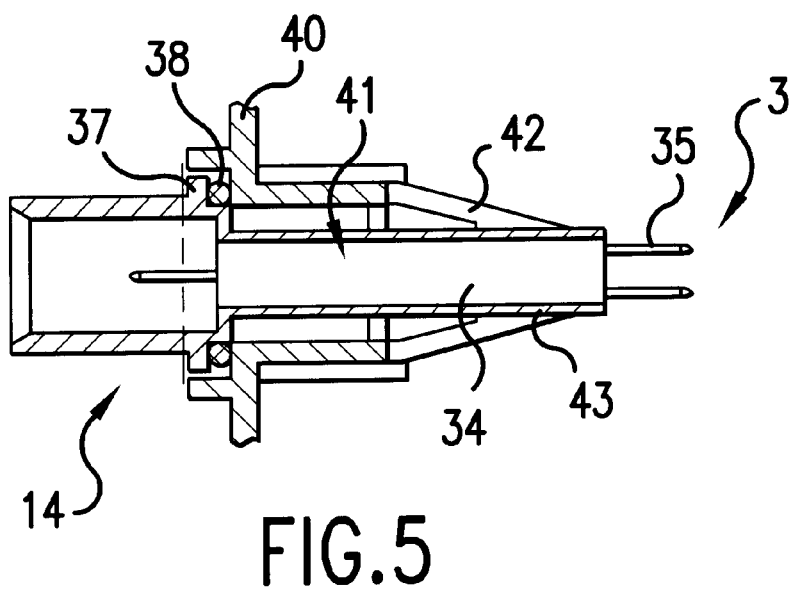
FIG. 5 is a section along line V—V in FIG. 4.

According to another embodiment of this invention, of FIGS. 4 and 5, a housing 34 of the electronic control unit 2 is structured to be rectangular, in agreement with the preceding embodiment, with a first contacting device 3 including two rows of contact elements 35. In contrast with the preceding embodiment, the second contacting device 14 has a single row of contact elements 36, so the housing 34 is structured to save space. The housing 34 has only a short peripheral web 37 projecting in a transverse direction in an area of the second contacting device 14, which web presses against a stop 39 of a headlight housing 40 via a gasket 38, in the assembled position. For a snap-lock connection of the housing 34 in a recess 41 in the headlight housing 40, spring-action snap-lock tabs 42 extending in the direction of the headlight are in contact with opposing longitudinal sides 43 of the housing 34, locking it in a stationary position in the recess 41.

Figure 6:
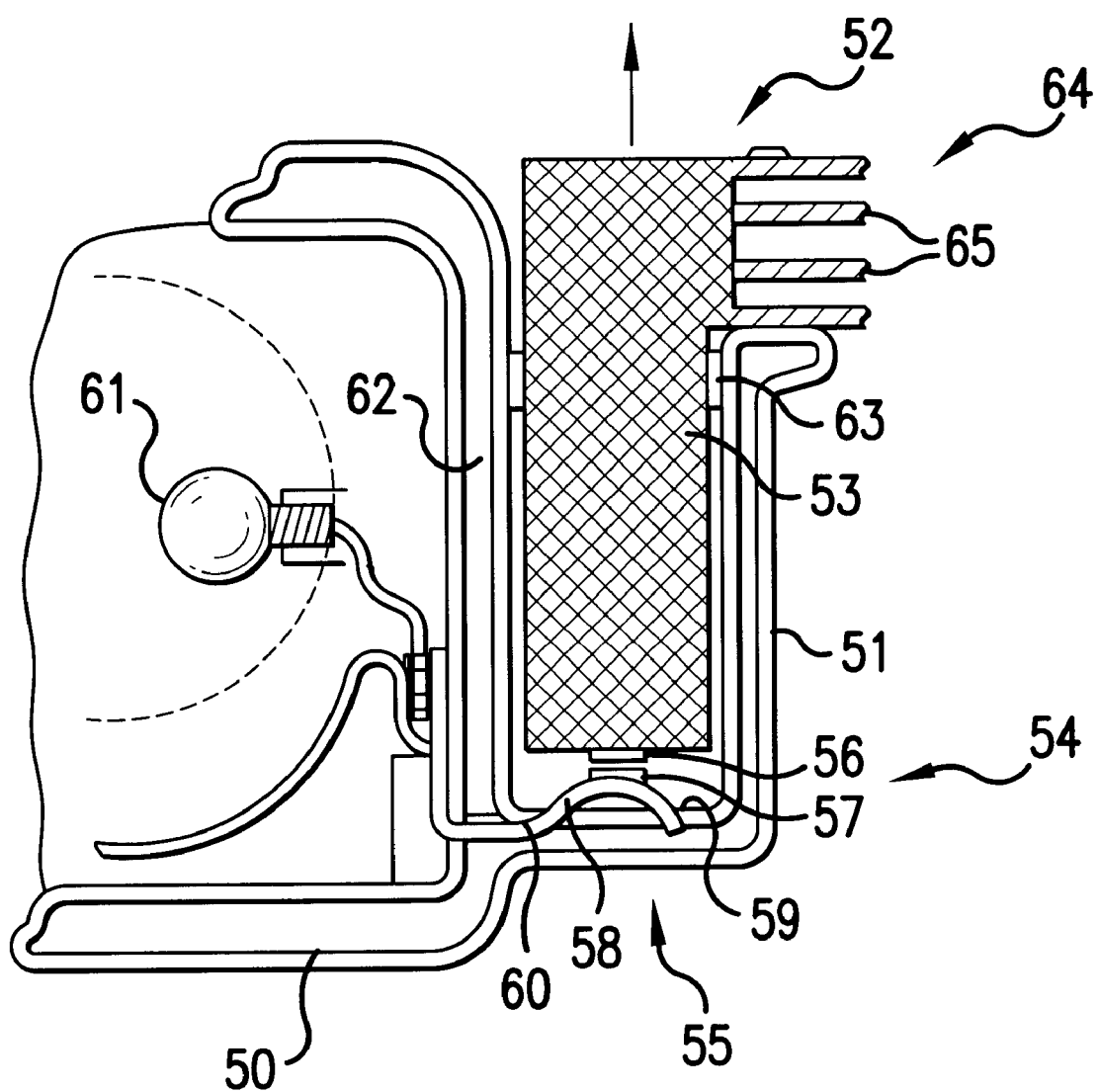
FIG. 6 is a longitudinal section through a light unit with an electronic control unit mounted in it in a third embodiment.

According to a third embodiment of FIG. 6, a pocket-shaped receptacle 51 is integrally formed, molded for example, on a back side of a headlight housing 50, forming an upper opening 52 for inserting a housing 53 for the electronic control unit 2. A first contacting device 54 is arranged in a floor area 55 of the receptacle 51 in the assembled position. The first contacting device 54 has surface contact elements 56, 57 of the electronic-control-unit housing 53 and the headlight housing 50 which extend essentially parallel to mutually parallel sides 58 of the housing 53 and a bottom side 59 of the receptacle 51. The contact elements 56, 57 are preferably structured to be relay-like. The contact element 57 is connected to spring leads 60 which lead to a light source 61 of the headlight 50.

The pocket-shaped receptacle 51 is structured as a U-shaped mounting part, including a back side 62 of the headlight housing 50. For correct positioning of the housing 53, peripheral gaskets 63 are provided in an area near the opening 52. Housing 53 corresponds in height and width essentially to the back side 62 of the headlight housing 50. A thickness of housing 53 corresponds to a width of the U-shaped mounting part 51. A second contacting device 64 with projecting contact elements 65 is arranged on an exposed upper area of a side of the housing 53 facing away from the light source 61. A structure of the second contacting device 64 corresponds essentially to that of the second contacting device 14 of the embodiment of FIGS. 2 and 3.

The pocket-shaped receptacle 51 structured according to this embodiment with an opening facing upward, assures easy servicing and easy mounting and contacting of the electronic-control-unit housing 53 with the components in the headlight housing 50.

We claim:

1. Control apparatus for a light unit of a vehicle with an electronic control unit for controlling the light unit, wherein the electronic control unit has an I/O interface for connecting with a plurality of control functions of the light unit;

wherein the electronic control unit (2) is arranged in a housing (24, 34, 53) which is detachably mounted in a receptacle, (41, 51) of the light unit (1); wherein, on a first side of the housing (24, 34, 53) a first contacting device (3, 54) is provided for connecting the electronic control unit (2) to a number of electric components (4, 5, 6, 7, 8, 9, 10, 11, 12, 13) integrated into the light unit (1), and, in addition, on a second side of the housing (24, 34, 53) a second contacting device (14, 64) is provided for connecting the electronic control unit (2) to a number of the additional electric components (15, 16, 17, 18, 19, 20) near the light unit (1).

2. Control apparatus of claim 1, wherein the housing (24, 34, 53) is mounted in a pocket-shaped receptacle (41, 51) of the light unit (1).

3. Control apparatus of claim 2, wherein the pocket-shaped receptacle (51) is structured so that a flat side (58) of the housing (53) is in direct contact with a back side (62) of the light unit (1).

4. Control apparatus of claim 2, wherein the pocket-shaped receptacle (51) is structured as a U-shaped mounting part formed on a back side (62) of the light unit (1).

5. Control apparatus of claim 1, wherein the receptacle (41) is structured so that the housing (24, 34) is inserted from a back side of the light unit (1) and the first contacting device (3) and the second contacting device (14) are arranged on opposite front and back end side of the housing (24, 34) in a direction of assembly.

6. Control apparatus of claim 5, wherein one of the first and the second contacting devices (14, 3) has projecting contact elements (31, 32, 35, 36) on the corresponding end sides of the housing (24, 34) and the contact elements (31, 32, 35, 36) are arranged in distributed patterns on the corresponding sides of the housing (24, 34) and almost completely cover these sides.

7. Control apparatus of claim 1, wherein the housing (24, 34) is removably attached in the receptacle of the light unit by a snap-lock attachment.

8. Control apparatus of claim 1, wherein at least one of the first and second contacting devices (54, 64) have flattened contact elements (56) which extend parallel to an adjacent side (58) of the housing (53).

9. Control apparatus of claim 1, wherein the first contacting device (3) can be connected to contact elements of one of a low beam light (5), a high beam light (6), a fog light (7), a turning light (8), a position light (9), a blinker light (10), a light-diffusor heater (11), a headlight beam adjuster (12), and a sensor (13) of the light unit (1), and the second contacting device (14) can be connected to contact elements of at least one of an additional high beam light (16), an additional fog light (17), an additional blinker light (18), an additional light-diffusor cleaning system (19) and an additional fan (20), arranged near the light unit.

10. Control apparatus of claim 9, wherein the second contacting device (14) can be connected to contact elements of at least one of a central light controller (21), an additional sensor (22) and a vehicle network (23).

* * * * *